(12) United States Patent
Koizumi

(10) Patent No.: US 10,542,241 B2
(45) Date of Patent: Jan. 21, 2020

(54) PROJECTOR

(71) Applicant: SEIKO EPSON CORPORATION, Tokyo (JP)

(72) Inventor: Ryuta Koizumi, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/287,043

(22) Filed: Feb. 27, 2019

(65) Prior Publication Data

US 2019/0268578 A1  Aug. 29, 2019

(30) Foreign Application Priority Data

Feb. 28, 2018 (JP) ................... 2018-034523

(51) Int. Cl.
*H04N 9/31* (2006.01)
*G02B 27/28* (2006.01)
*G03B 21/20* (2006.01)

(52) U.S. Cl.
CPC ......... *H04N 9/3167* (2013.01); *G02B 27/283* (2013.01); *G03B 21/204* (2013.01); *G03B 21/2073* (2013.01); *H04N 9/3105* (2013.01); *H04N 9/3158* (2013.01); *H04N 9/3164* (2013.01)

(58) Field of Classification Search
CPC ...... H04N 9/31; H04N 9/3167; H04N 9/3105; H04N 9/3158; H04N 9/3164; G02B 27/285; G03B 21/204; G03B 21/2073

USPC .......... 348/756, 762, 744; 362/260
See application file for complete search history.

(56) References Cited

U.S. PATENT DOCUMENTS

| | | | | |
|---|---|---|---|---|
| 8,733,940 B2* | 5/2014 | Tanaka | ........... | G03B 21/28 353/20 |
| 9,429,831 B2* | 8/2016 | Akiyama | ........... | G03B 21/2073 |
| 9,500,937 B2* | 11/2016 | Tanaka | ........... | G03B 21/204 |
| 10,015,456 B2* | 7/2018 | Toyooka | ........... | G02B 5/3083 |

FOREIGN PATENT DOCUMENTS

JP   2007-199538 A   8/2007
JP   2011-203616 A   10/2011

\* cited by examiner

*Primary Examiner* — Trang U Tran
(74) *Attorney, Agent, or Firm* — Oliff PLC

(57) ABSTRACT

A polarization separation element that separates a light emitted from a first light emitting device into a light having first polarization in a first wavelength range and a light having second polarization in the first wavelength range, a wavelength conversion element converts the light into a light in a second wavelength range, a first light modulation device modulates the entering light according to image information, an optical element that separates the light in the second wavelength range into a light in a third wavelength range and a light in a fourth wavelength range, a second light modulation device that modulates the light according to the image information, a third light modulation device that modulates the light according to the image information, and a projection system that projects an image light are provided, wherein the wavelength conversion element has a first surface and a second surface different from the first surface.

12 Claims, 3 Drawing Sheets

PROJECTOR

BACKGROUND

1. Technical Field

The present invention relates to a projector.

2. Related Art

Recently, it has been known that LEDs are used as light sources in light source devices for projector. For example, in a projector disclosed in Patent Document 1 (JP-A-2007-199538), blue light emitted from an LED is modulated by a liquid crystal panel and blue image light is generated. In the projector, the blue lights are transmitted through a polarization conversion element, and thereby, the polarization directions of the blue lights entering the liquid crystal panel are made uniform.

The polarization directions incident to the liquid crystal panel are unidirectional using the polarization conversion element, however, the apparent light source area (light emission area) is doubled. When the apparent light emission area is increased, there is a problem that it is hard to efficiently take light into a downstream optical system and light loss is produced.

SUMMARY

An advantage of some aspects of the invention is to provide a projector in which light loss may be reduced.

A projector according to an aspect of the invention includes a first light emitting device that emits a light having first polarization in a first wavelength range and a light having second polarization in the first wavelength range, a polarization separation element that separates the lights into the light having the first polarization in the first wavelength range and the light having the second polarization in the first wavelength range, a wavelength conversion element, into which one of the light having the first polarization in the first wavelength range and the light having the second polarization in the first wavelength range is entered, that converts the light in the first wavelength range into light in a second wavelength range, a first light modulation device, into which the other of the light having the first polarization in the first wavelength range and the light having the second polarization in the first wavelength range is entered, that modulates the entering light according to image information and forms an image light, an optical element that separates the light in the second wavelength range into a light in a third wavelength range and a light in a fourth wavelength range, a second light modulation device that modulates the light in the third wavelength range according to the image information and forms an image light, a third light modulation device that modulates the light in the fourth wavelength range according to the image information and forms an image light, and a projection system that projects the image lights, wherein the wavelength conversion element has a first surface entered by the light in the first wavelength range and a second surface different from the first surface and outputting the light in the second wavelength range.

In the aspect of the invention, it is preferable that the wavelength conversion element has a third surface different from the first surface and the second surface, a second light emitting device is provided to face the third surface and emit a light in the first wavelength range, and the light in the first wavelength range emitted from the second light emitting device enters the wavelength conversion element from the third surface.

In the aspect of the invention, it is preferable that the wavelength conversion element further has a reflection layer provided on at least one of the first surface and the third surface, transmitting the light in the first wavelength range, and reflecting the light in the second wavelength range.

In the aspect of the invention, it is preferable that the first light emitting device and the first light modulation device are optically conjugate with each other.

In the aspect of the invention, it is preferable that an area of the second surface is smaller than an area of the first surface.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
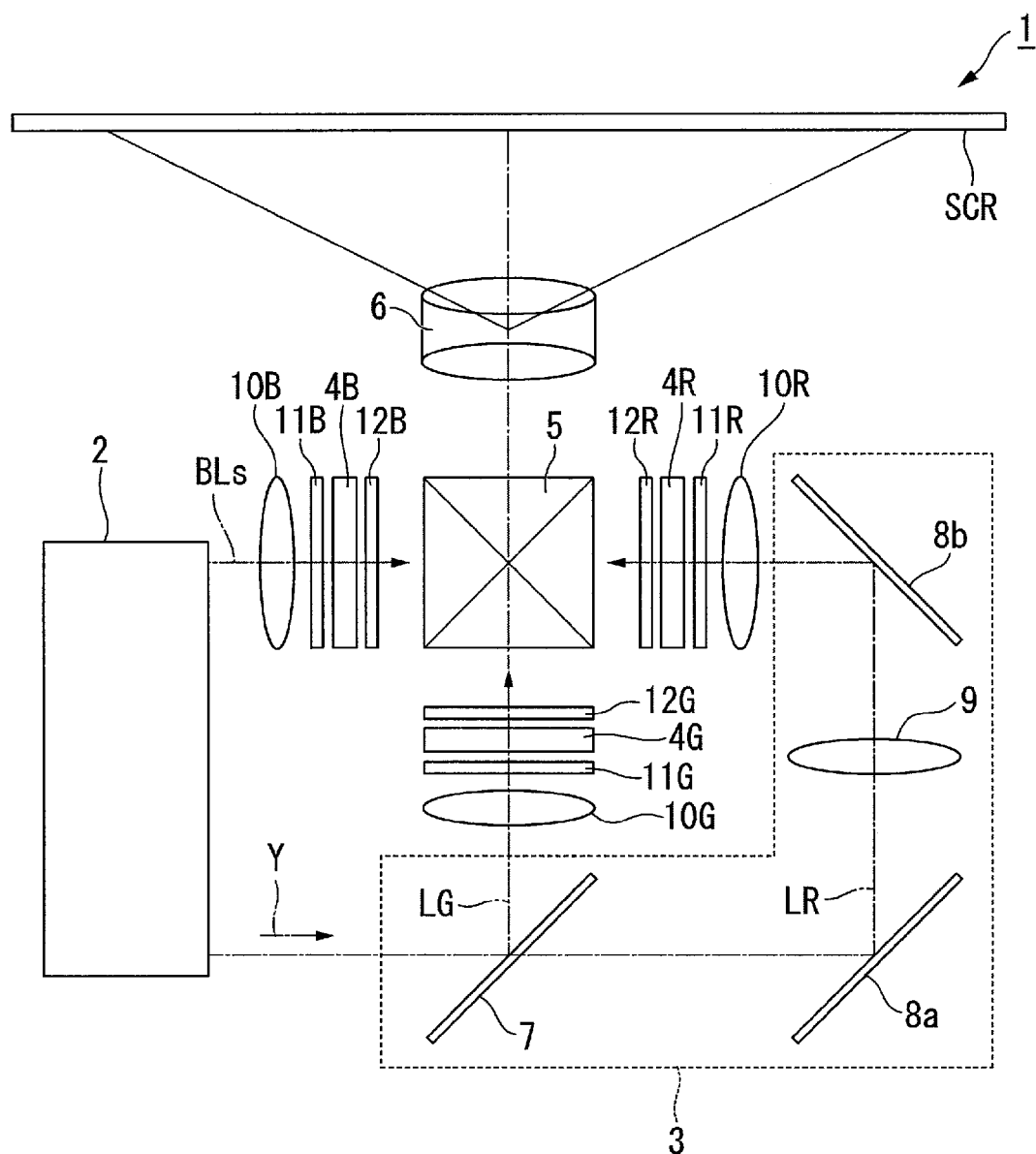
FIG. 1 shows a schematic configuration of a projector according to one embodiment.

As below, an embodiment of the invention will be explained in detail with reference to the drawings.

Note that, in the drawings to be used in the following explanation, for clearly showing characteristics, characteristic parts may be enlarged for convenience, and dimension ratios of the respective component elements are not necessarily the same as the real ones.

An example of a projector according to the embodiment will be explained.

FIG. 1 shows a schematic configuration of the projector according to the embodiment.

As shown in FIG. 1, a projector 1 of the embodiment is a projection-type image display apparatus that displays a color picture on a screen SCR. The projector 1 includes an illumination device 2, a color separation system 3, a light modulation device 4R, a light modulation device 4G, a light modulation device 4B, a light combining system 5, and a projection system 6.

As will be described later, the illumination device 2 radiates a blue light BLs and a yellow fluorescent light Y. The specific configuration of the illumination device 2 will be described later. The color separation system 3 separates the yellow fluorescent light Y from the illumination device 2 into a red light LR and a green light LG.

The light modulation device 4R, the light modulation device 4G, and the light modulation device 4B modulate the red light LR, the green light LG, and the blue light BLs according to image information, respectively, and form image lights of the respective colors. The light combining system 5 combines the image lights of the respective colors from the respective light modulation devices 4R, 4G, 4B. The projection system 6 projects the combined image light from the light combining system 5 toward the screen SCR.

The color separation system 3 includes a dichroic mirror 7, a first reflection mirror 8a, a second reflection mirror 8b, and a relay lens 9.

The dichroic mirror 7 separates the yellow fluorescent light Y output from the illumination device 2 into the respective red light LR and green light LG. That is, the dichroic mirror 7 has a property of transmitting the red light LR and reflecting the green light LG. In the embodiment, the red light LR corresponds to "light in a third wavelength range" described in the appended claims, the green light LG corresponds to "light in a fourth wavelength range" described in the appended claims, and the dichroic mirror 7 corresponds to "optical element" described in the appended claims.

The first reflection mirror 8a and the second reflection mirror 8b are placed in the optical path of the red light LR and guides the red light LR transmitted through the dichroic mirror 7 to the light modulation device 4R. The relay lens 9 is placed at the downstream of the first reflection mirror 8a in the optical path of the red light LR.

The respective light modulation device 4R, light modulation device 4G, and light modulation device 4B include liquid crystal panels. The respective light modulation device 4R, light modulation device 4G, and light modulation device 4B modulate the respective red light LR, green light LG, and blue light BLs according to image information while the red light LR, green light LG, and blue light BLs pass through, and form image lights corresponding to the respective colors.

In the embodiment, the light modulation device 4B corresponds to "first light modulation device" described in the appended claims, the light modulation device 4R corresponds to "second light modulation device" described in the appended claims, and the light modulation device 4G corresponds to "third light modulation device" described in the appended claims.

In the embodiment, light incident-side polarizers and light exiting-side polarizers are placed on the light incident sides and the light exiting sides of the respective light modulation device 4R, light modulation device 4G, and light modulation device 4B. Specifically, the light incident-side polarizer 11R and the light exiting-side polarizer 12R are placed on the light incident side and the light exiting side of the light modulation device 4R. These light incident-side polarizer 11R and light exiting-side polarizer 12R have e.g. a configuration in which transmission axes are orthogonal to each other (crossed Nichols arrangement).

The light incident-side polarizer 11G and the light exiting-side polarizer 12G are placed on the light incident side and the light exiting side of the light modulation device 4G. These light incident-side polarizer 11G and light exiting-side polarizer 12G have e.g. a configuration in which transmission axes are orthogonal to each other (crossed Nichols arrangement).

The light incident-side polarizer 11B and the light exiting-side polarizer 12B are placed on the light incident side and the light exiting side of the light modulation device 4B. These light incident-side polarizer 11B and light exiting-side polarizer 12B have e.g. a configuration in which transmission axes are orthogonal to each other (crossed Nichols arrangement).

On the light incident sides of the respective light modulation device 4R, light modulation device 4G, and light modulation device 4B, a field lens 10R, a field lens 10G, and a field lens 10B that parallelize the respective red light LR, green light LG, and blue light BLs entering the respective light modulation device 4R, light modulation device 4G, and light modulation device 4B are provided, respectively.

The light combining system 5 includes a cross dichroic prism. The light combining system 5 combines the image lights of the respective colors from the respective light modulation device 4R, light modulation device 4G, and light modulation device 4B and outputs the combined image light toward the projection system 6.

The projection system 6 includes a projection lens group. The projection system 6 enlarges and projects the image light combined by the light combining system 5 toward the screen SCR. That is, the projection system 6 projects the lights modulated by the respective light modulation device 4R, light modulation device 4G, and light modulation device 4B on the screen SCR. Thereby, an enlarged color picture (image) is displayed on the screen SCR.

Illumination Device

Figure 2:
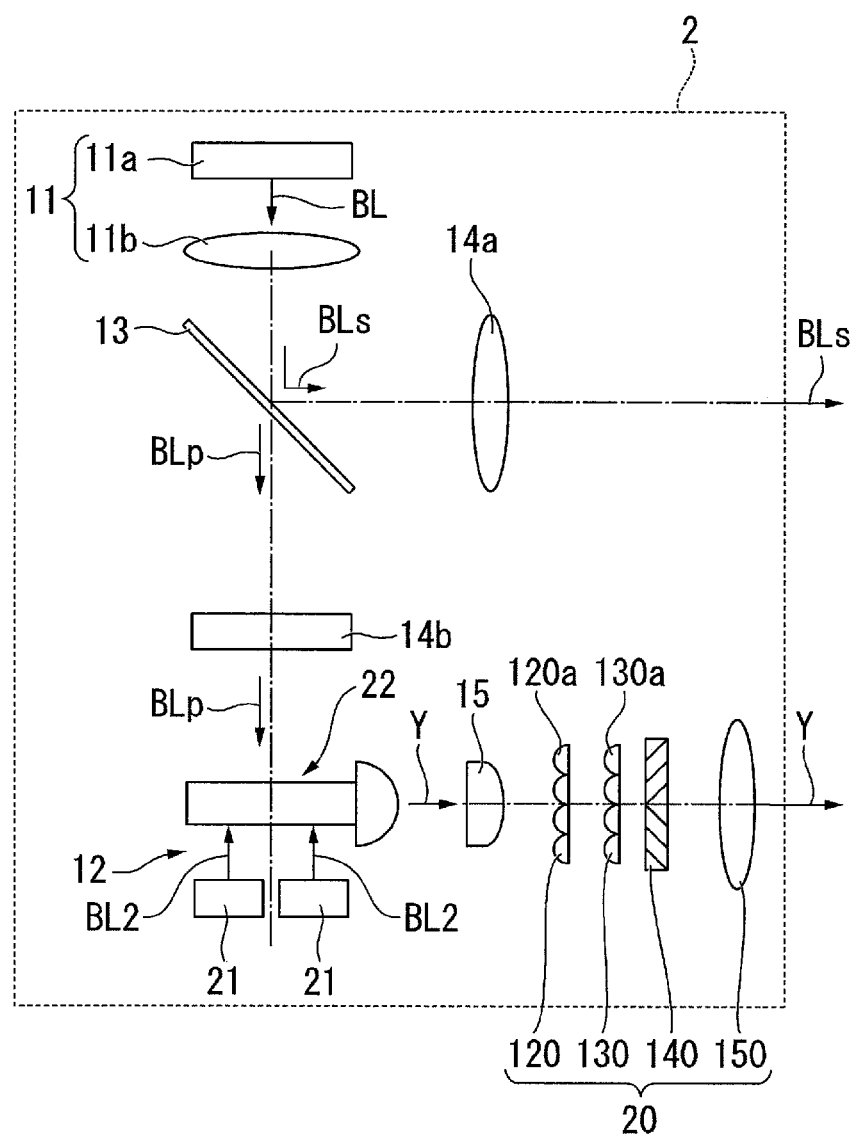
FIG. 2 shows a schematic configuration of an illumination device.

Next, the configuration of the illumination device 2 will be explained. FIG. 2 shows a schematic configuration of the illumination device. As shown in FIG. 2, the illumination device 2 includes a first light source unit 11, a second light source unit 12, a polarization separation element 13, a first collecting lens 14a, a second collecting lens 14b, a pickup lens 15, and a homogeneous illumination system 20.

In the embodiment, the first light source unit 11 includes a first light emitting device 11a and a collimator lens 11b. The first light emitting device 11a includes an LED and emits a blue light BL containing a light having P-polarization (first polarization) in a first wavelength range and a light having S-polarization (second polarization) in the first wavelength range. Here, the light in the first wavelength range corresponds to e.g. a light having a peak of light emission intensity from 430 nm to 480 nm. In the embodiment, the first light emitting device 11a corresponds to "first light emitting device" described in the appended claims.

The collimator lens 11b converts the blue light BL emitted from the first light emitting device 11a into parallel light. The blue light BL converted into parallel light by the collimator lens 11b enters the polarization separation element 13.

The polarization separation element 13 selectively separates the light BLs of the S-polarized light component and light BLp of the P-polarized light component to the polarization separation element 13 from the components contained in the blue light BL. Specifically, the polarization separation element 13 has a polarization separation function of separating the traveling directions of the two lights by reflecting the light BLs of the S-polarized light component and transmitting the light BLp of the P-polarized light component.

In the embodiment, the light BLs corresponds to "light having first polarization in a first wavelength range" described in the appended claims, and the light BLp corresponds to "light having second polarization in the first wavelength range" described in the appended claims.

In the illumination device 2 of the embodiment, the light BLs is used for generation of a blue image light and the light BLp is used for excitation of a fluorescent light as will be described later. In the following explanation, the light BLs will be referred to as "blue light BLs" and the light BLp will be referred to as "excitation light BLp".

The blue light BLs of the S-polarized light component separated by reflection by the polarization separation element 13 enters e.g. the first collecting lens 14a including a convex lens. The blue light BLs is guided to the light modulation device 4B via the collecting lens 14 and the field lens 10B.

The transmission axis of the light incident-side polarizer 11B placed on the light incident side of the light modulation device 4B corresponds to S-polarized light. Accordingly, the blue light BLs of the S-polarized light component is successfully guided to the light modulation device 4B without being shielded by the light incident-side polarizer 11B. The light modulation device 4B modulates the blue light BLs according to image information and forms image light corresponding to the blue light BLs. The image light generated by the light modulation device 4B enters the light combining system 5 via the light exiting-side polarizer 12B.

In the embodiment, the first light emitting device 11a (first light emitting device) and the light modulation device 4B are optically conjugate with each other. Specifically, the light exiting surface of the first light emitting device 11a and the light incident area (pixel formation area) of the light modulation device 4B are optically conjugate with each other. Thereby, the first light emitting device 11a may form an illumination area having the same luminance distribution as the light exiting surface of the first light emitting device 11a on the light incident area of the light modulation device 4B which optically conjugates with each other.

Note that it is desirable that the light exiting surface of the first light emitting device 11a and the light incident area of the light modulation device 4B are formed to have a similarity relationship. According to the configuration, the light output from the light exiting surface of the first light emitting device 11a may be efficiently entered onto the light modulation device 4B by appropriate adjustment of scaling factors of the first collecting lens 14a and the field lens 10B.

On the other hand, the excitation light BLp of the P-polarized light component transmitted and separated through the polarization separation element 13 enters the second collecting lens 14b. The second collecting lens 14b includes e.g. a cylinder lens. The second collecting lens 14b of the cylinder lens collects and makes the excitation light BLp incident into a wavelength conversion part 22, which will be described later.

The second light source unit 12 includes a plurality of second light emitting devices 21 and the wavelength conversion part 22. Each second light emitting device 21 includes e.g. an LED. That is, the second light emitting device 21 emits an excitation light BL2 having the first wavelength range. In the embodiment, for example, a light having a peak light emission intensity of about 445 nm is used as the excitation light BL2. In the embodiment, the second light emitting device 21 corresponds to "second light emitting device" described in the appended claims.

The excitation lights BL2 emitted from the second light emitting devices 21 enter the wavelength conversion part 22. In the embodiment, the excitation light BLp separated by the polarization separation element 13 enters the wavelength conversion part 22.

The wavelength conversion part 22 converts the excitation light BL2 and the excitation light BLp into a yellow fluorescent light Y in a second wavelength range different from the first wavelength range. Here, the light in the second wavelength range corresponds to e.g. a yellow light having a peak of light emission intensity from 520 nm to 580 nm.

Figure 3:
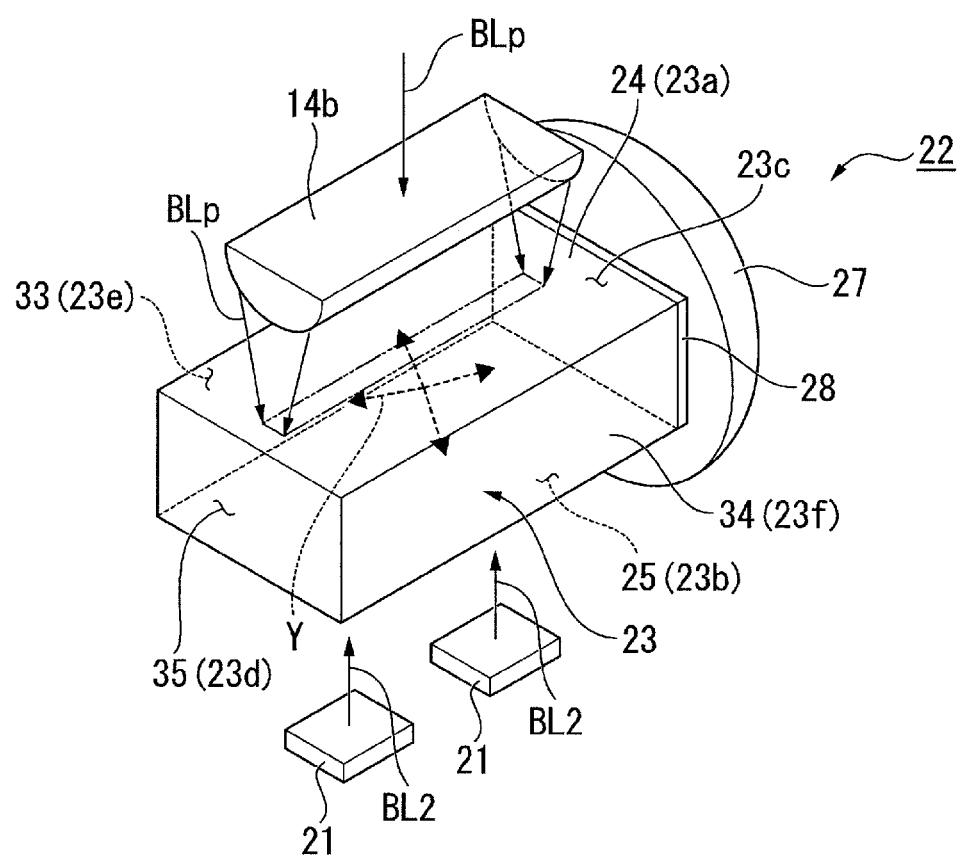
FIG. 3 is a perspective view showing a main part configuration of a wavelength conversion part.

FIG. 3 is a perspective view showing a main part configuration of the wavelength conversion part 22.

As shown in FIGS. 2 and 3, the wavelength conversion part 22 includes a fluorescent material (wavelength conversion element) 23, a dichroic mirror 24, a dichroic mirror 25, a dichroic mirror 26, an optical member 27, a reflection layer 33, a reflection layer 34, and a reflection layer 35. In the embodiment, the fluorescent material 23 has a flat plate shape having a plurality of surfaces, and converts the excitation lights BL2 entering from the second light emitting devices 21 and the excitation light BLp into the yellow fluorescent light Y in the second wavelength range different from the first wavelength range. Specifically, the fluorescent material 23 has a hexahedral shape.

The fluorescent material 23 in the hexahedral shape has three sets of surfaces facing each other. Specifically, the fluorescent material 23 has a first surface 23a and a third surface 23b facing each other, a second surface 23c and a sixth surface 23d facing each other, and a fourth surface 23e and a fifth surface 23f facing each other.

In the embodiment, the fluorescent material 23 contains fluorescent particles (not shown) that convert the excitation light BL2 and the excitation light BLp into the yellow fluorescent light Y. As the fluorescent particles, e.g. YAG (yttrium aluminum garnet) fluorescent material is used. Note that one kind of material may be used as the material forming the fluorescent particles, or particles formed using two or more kinds of materials being mixed may be used. As the fluorescent material 23, a fluorescent material formed by dispersion of fluorescent particles in an inorganic binder of alumna or the like or a fluorescent material formed by sintering of the fluorescent particles without using the binder is preferably used.

As the fluorescent material 23 of the embodiment, a material having a low light scattering property is used. That is, as the fluorescent material 23, a material having a smaller amount of pores that function as light scattering members is employed. According to the configuration, production of light loss of the yellow fluorescent light Y reflected by the dichroic mirror 24, the dichroic mirror 25, the dichroic mirror 26, the reflection layer 33, the reflection layer 34, or the reflection layer 35 at a plurality of times within the fluorescent material 23 may be reduced.

In the embodiment, the second collecting lens 14b of the first light source unit 11 is placed to face the first surface 23a of the fluorescent material 23. Further, the second light emitting devices 21 of the second light source unit 12 are placed to face the third surface 23b of the fluorescent material 23.

That is, the excitation light BLp emitted from the first light source unit 11 and separated by the polarization separation element 13 enters the first surface 23a. The excitation lights BL2 emitted from the second light emitting devices 21 enter the third surface 23b. The yellow fluorescent light Y converted in the fluorescent material 23 is output from the second surface 23c.

In the embodiment, the dichroic mirror 24 is provided on the first surface 23a. The dichroic mirror 24 is a dielectric multilayer that transmits the excitation light BLp having the first wavelength range and reflects the yellow fluorescent light Y having the second wavelength range.

The dichroic mirror 25 is provided on the third surface 23b. The dichroic mirror 25 is a dielectric multilayer that transmits the excitation light BL2 having the first wavelength range and reflects the yellow fluorescent light Y having the second wavelength range.

The reflection layer 33 is provided on the fourth surface 23e. The reflection layer 33 reflects the fluorescent light (converted light) Y generated within the fluorescent material 23. More specifically, the reflection layer 33 includes a metal film that reflects the yellow fluorescent light Y. For example, the reflection layer 33 is a silver mirror. The reflection layer 33 is provided, and thereby, the yellow fluorescent light Y may be successfully propagated toward the second surface 23c within the fluorescent material 23.

The reflection layer 34 is provided on the fifth surface 23f. The reflection layer 34 reflects the fluorescent light (converted light) Y generated within the fluorescent material 23. More specifically, the reflection layer 34 includes a metal film that reflects the yellow fluorescent light Y. For example, the reflection layer 34 is a silver mirror. The reflection layer 34 is provided, and thereby, the yellow fluorescent light Y may be successfully propagated toward the second surface 23c within the fluorescent material 23.

The reflection layer 35 is provided on the sixth surface 23d. The reflection layer 35 reflects the fluorescent light (converted light) Y generated within the fluorescent material 23. More specifically, the reflection layer 35 includes a metal film that reflects the yellow fluorescent light Y. For example, the reflection layer 35 is a silver mirror. The reflection layer 35 is provided, and thereby, the yellow fluorescent light Y may be successfully propagated toward the second surface 23c within the fluorescent material 23.

In the embodiment, the optical member 27 is provided on the second surface 23c of the fluorescent material 23. The optical member 27 is bonded to the second surface 23c via an adhesive layer 28. The optical member has a function of taking out the fluorescent light (converted light) Y from the second surface 23c.

It is preferable that, as the adhesive layer 28, a material having a refractive index equal to the refractive index of the fluorescent material 23 or a higher refractive index than the fluorescent material 23 is used. Further, it is desirable that the refractive index of the adhesive layer 28 is lower than the refractive index of the optical member 27.

According to the configuration, total reflection of the yellow fluorescent light Y on the interface between the fluorescent material 23 and the adhesive layer 28 and on the interface between the adhesive layer 28 and the optical member 27 may be prevented. Thus, the yellow fluorescent light Y may be efficiently taken to outside of the fluorescent material 23.

In the embodiment, the yellow fluorescent light Y output from the optical member 27 enters the pickup lens 15. The pickup lens 15 converts the yellow fluorescent light Y into a parallel light. The yellow fluorescent light Y parallelized by the pickup lens 15 enters the homogeneous illumination system 20.

The homogeneous illumination system 20 includes a first lens array 120, a second lens array 130, a polarization conversion element 140, and a superimposing lens 150.

The first lens array 120 has a plurality of first lenses 120a for dividing the yellow fluorescent light Y into a plurality of partial luminous fluxes. The plurality of first lenses 120a are arranged in a matrix form within a plane orthogonal to the optical axis.

The second lens array 130 has a plurality of second lenses 130a corresponding to the plurality of first lenses 120a of the first lens array 120. The second lens array 130 forms images of the respective first lenses 120a of the first lens array 120 in the vicinities of the image formation areas of the light modulation device 4G and the light modulation device 4R with the superimposing lens 150.

The polarization conversion element 140 converts the yellow fluorescent light Y output from the second lens array 130 into linearly-polarized light. The polarization conversion element 140 includes e.g. a polarization separation film and a retardation film (neither thereof shown).

The polarization conversion element 140 aligns the polarization direction of the yellow fluorescent light Y with the direction of the transmission axes of the light incident-side polarizers 11R, 11G placed on the light incident sides of the light modulation devices 4R, 4G. Thereby, as described above, the polarization directions of the red light LR and the green light LG obtained by separation of the yellow fluorescent light Y correspond to the directions of the transmission axes of the light incident-side polarizers 11R, 11G. Thus, the red light LR and the green light LG are not shielded by the light incident-side polarizers 11R, 11G, but successfully guided to the light modulation devices 4R, 4G, respectively.

The superimposing lens 150 collects and superimposes the respective partial luminous fluxes output from the polarization conversion element 140 on the vicinities of the image formation areas of the light modulation device 4R and the light modulation device 4G shown in FIG. 1.

As described above, the illumination device 2 outputs the yellow fluorescent light Y having a nearly homogeneous distribution toward the color separation system 3.

According to the illumination device 2 of the embodiment, the lights BLs, BLp separated by the polarization separation element 13 are respectively used, and use efficiency of the light emitted from the first light source unit 11 is higher. Further, the polarization conversion element for unidirectionally aligning the polarization directions is not placed in the optical path of the blue light BLs, and thus, the apparent light source area (light emission area) of the first light emitting device 11a that emits the blue light BL is not increased.

Here, if the apparent light emission area that emits the light which enters the light modulation device 4B is increased, the light is harder to be taken into the optical system and the light is not efficiently guided to the light modulation device 4B via the optical system. That is, light loss is produced.

On the other hand, according to the illumination device 2 of the embodiment, the polarization conversion element is not used, and thus, production of light loss due to increase of the apparent light emission area may be reduced. Therefore, the light output from the first light source unit 11 may be efficiently used.

According to the illumination device 2 of the embodiment, the light intensity distribution in the light incident surface of the first light emitting device 11a formed by the LED is highly homogeneous compared with the light intensity distribution in a light exiting surface of a semiconductor laser that outputs coherence light. Accordingly, even in the case where e.g. a homogeneous illumination system using a multi-lens array is not placed between the first light emitting device 11a and the light modulation device 4B, the light modulation device 4B may be illuminated by the highly homogeneous blue light BLs.

As described above, according to the illumination device 2 of the embodiment, the multi-lens array may be omitted from the optical path of the blue light BLs entering the light modulation device 4B, and thereby, the optical system in the blue light BLs may be downsized and light loss due to the multi-lens array may be reduced.

In the wavelength conversion part 22 of the embodiment, the yellow fluorescent light Y generated within the fluorescent material 23 has homogeneous intensity in global directions, and the yellow fluorescent light Y enters the first surface 23a or third surface 23b at various angles. Accordingly, if the dichroic mirror 24 and the dichroic mirror 25 are not provided on the first surface 23a and the third surface 23b, respectively, the beams at the angles equal to or smaller than the total reflection angle of the yellow fluorescent light Y are transmitted through the first surface 23a and the third surface 23b and leak out. That is, the leaked light is lost and decreases light use efficiency.

On the other hand, according to the wavelength conversion part 22 of the embodiment, the dichroic mirror and the dichroic mirror 25 are provided on the first surface 23a as the light incident surface for the excitation light BLp and the third surface 23b as the light incident surface for the excitation light BL2, respectively, and thereby, the excitation light BLp and the excitation light BL2 may be efficiently taken into the fluorescent material 23.

That is, even when the yellow fluorescent light Y enters the first surface 23a and the third surface 23b at the incident angles equal to or smaller than the total reflection angle, the light is reflected by the dichroic mirror 24 or the dichroic mirror 25 and propagates within the fluorescent material 23. Accordingly, the yellow fluorescent light Y is not output to outside of the fluorescent material 23 as leaked light, but efficiently output from the second surface 23c (light exiting surface).

Further, in the fluorescent material 23 of the embodiment, the area of the light exiting surface (second surface 23c) is smaller than the areas of the light incident surfaces (first surface 23a and third surface 23b). The incident areas of the excitation lights BLp, BL2 in the fluorescent material 23 are made larger, and thereby, light density of the excitation light in the light incident surface may be suppressed. Therefore, the yellow fluorescent light Y may be efficiently generated in the fluorescent material 23. Further, the light emission area (the area of the light exiting surface) of the yellow fluorescent light Y is made smaller, and thereby, the downstream optical system, i.e., the pickup lens 15 and the homogeneous illumination system 20 in the embodiment may be downsized.

In the state in which the polarization directions are aligned by transmission through the polarization conversion element 140, the apparent light emission area of the yellow fluorescent light Y is doubled. That is, the light emission area before transmission through the polarization conversion element 140 corresponds to the size of the light exiting surface (second surface 23c) of the fluorescent material 23, and the light emission area after transmission through the polarization conversion element 140 corresponds to twice the size of the light exiting surface (second surface 23c) of the fluorescent material 23.

In the embodiment, the area of the light exiting surface (second surface 23c) is smaller than the areas of the light incident surfaces (first surface 23a and third surface 23b). That is, the area of the light exiting surface (second surface 23c) is made smaller in advance, and thereby, light loss produced by the increase of the apparent light emission area after transmission through the polarization conversion element 140 may be reduced.

The advantages of the embodiment are as follows.

According to the projector of the embodiment, the lights separated by the polarization separation element are respectively used for the generation of the image light and the generation of the light in the second wavelength range without using the polarization conversion element, and thereby, the use efficiency of the light emitted from the first light emitting device is higher. Further, the polarization conversion element is not used, and thereby, the production of light loss due to increase of the apparent light emission area may be reduced.

That is, according to the projector 1 of the embodiment, the light is separated by the polarization separation element 13 of the illumination device 2 into the blue light BLs and the excitation light BLp without using the polarization conversion element, the blue light BLs is used for the generation of image light in the light modulation device 4B and the excitation light BLp is used for the generation of the yellow fluorescent light Y in the wavelength conversion part 22, and thereby, the use efficiency of the light emitted from the first light emitting device 11a is higher. Further, the polarization conversion element is not used, and thereby, the production of light loss due to increase of the apparent light emission area may be reduced.

According to the projector of the embodiment, the amount of light in the first wavelength range entering the wavelength conversion element may be increased. Thereby, the amount of light in the second wavelength range entering the wavelength conversion element may be increased.

That is, according to the projector 1 of the embodiment, by the second light emitting devices 21, the amount of light in the first wavelength range (excitation light BL2) entering the wavelength conversion part 22 (fluorescent material 23) may be increased. Thereby, the amount of yellow fluorescent light Y generated within the wavelength conversion part 22 (fluorescent material 23) may be increased.

According to the projector of the embodiment, the light in the first wavelength range may be efficiently taken into the wavelength conversion element. Further, even in the case where the light in the second wavelength range enters the first surface or third surface at an incident angle equal to or smaller than the total reflection angle, the light in the second wavelength range may be reflected and propagated within the wavelength conversion element.

That is, according to the projector 1 of the embodiment, the excitation light BLp and the excitation light BL2 may be efficiently taken into the wavelength conversion part 22 (fluorescent material 23) by the dichroic mirror 24 and the dichroic mirror 25. Further, even in the case where the yellow fluorescent light Y enters the first surface 23a or third surface 23b at an incident angle equal to or smaller than the total reflection angle, the yellow fluorescent light Y may be reflected and propagated within the fluorescent material 23.

According to the projector of the embodiment, the illumination area having the same luminance distribution as the light exiting surface of the first light emitting device may be formed on the first light modulation device optically conjugates with each other. Therefore, even in the case where the homogeneous illumination system using the multi-lens array is not placed between the first light emitting device and the light modulation device, the light modulation device may be illuminated by highly homogeneous light.

That is, according to the projector 1 of the embodiment, the illumination area having the same luminance distribution as the light exiting surface of the first light emitting device 11a may be formed on the light modulation device 4B optically conjugates with each other. Therefore, even in the case where the homogeneous illumination system using the multi-lens array is not placed between the first light emitting device 11a and the light modulation device 4B, the light modulation device may be illuminated by highly homogeneous light.

According to the projector of the embodiment, the light exiting surface is made larger than the light incident surface of the excitation light in the wavelength conversion element, and the light emission area of the light in the second wavelength range is smaller. Thereby, the optical system located at the downstream of the wavelength conversion element may be downsized.

That is, according to the projector 1 of the embodiment, the second surface 23c of the fluorescent material 23 is made larger than the first surface 23a and the third surface 23b of the fluorescent material 23, and the light emission area of the yellow fluorescent light Y is smaller. Thereby, the optical system located at the downstream of the fluorescent material 23 may be downsized.

As described above, according to the projector 1 of the embodiment, in the first light source unit 11 of the illumination device 2, the light emitted from the first light emitting device 11a is efficiently used using the polarization separation element 13, and thereby, light loss may be reduced. Therefore, according to the projector 1 of the embodiment, bright blue light BLs and yellow fluorescent light Y are generated, and thereby, images with good quality may be displayed.

The invention is not limited to the above described embodiments, but appropriate changes can be made without departing from the scope of the invention.

For example, in the above described embodiment, the LED is used as the first light emitting device 11a of the first light source unit 11, however, a semiconductor laser may be used. In this regard, a transmissive diffusion member is placed between the semiconductor laser (first light emitting device 11a) and the polarization separation element 13. The laser beam has a lower homogeneous illuminance distribution than the LED. Accordingly, the light is diffused by the transmissive diffusion member, and thereby, the blue light BLs may be entered into the light modulation device 4B with improved homogeneity of the illuminance distribution.

Similarly, semiconductor lasers may be used in place of the LEDs as the second light emitting devices 21 of the second light source unit 12 that emits the excitation light BL2.

In the above described embodiment, the polarization separation element 13 having the polarization separation function of separating the traveling directions of the two lights by reflecting the light BLs of the S-polarized light component and transmitting the light BLp of the P-polarized light component is taken as an example, however, the element may be replaced by an element having the polarization separation function of separating the traveling directions of the two lights by transmitting the light BLs of the S-polarized light component and reflecting the light BLp of the P-polarized light component. In this case, the light BLp enters the light modulation device 4B as the blue light and the light BLs enters the fluorescent material 23 as the excitation light.

In the above described embodiment, the case where the second light source unit 12 includes the two light emitting devices 21 is taken as an example, however, the number of light emitting devices 21 is not limited to two. That is, the number of light emitting devices 21 may be one, three, or more.

In the above described embodiment, the case where the fluorescent material 23 has the hexahedral shape (flat plate shape) is taken as an example, however, the shape of the fluorescent material 23 is not limited to that. For example, the fluorescent material 23 may have a tapered shape oblique farther from or closer to the center axis perpendicular to the third surface 23b as the first surface 23a and the second surface 23c come closer to the third surface 23b. Or, the fluorescent material 23 may be formed in a tetrahedral shape (trigonal pyramid), pentahedral shape, or polyhedral shape having seven or more faces.

The entire disclosure of Japanese Patent Application No. 2018-034523, filed on Feb. 28, 2018 is expressly incorporated by reference herein.

What is claimed is:

1. A projector comprising:
a first light emitting device that emits light containing a light having first polarization in a first wavelength range and a light having second polarization in the first wavelength range;
a polarization separation element that separates the light emitted from the first light emitting device into the light having the first polarization in the first wavelength range and the light having the second polarization in the first wavelength range;
a wavelength conversion element, into which one of the light having the first polarization in the first wavelength range and the light having the second polarization in the first wavelength range is entered, that converts the light in the first wavelength range into a light in a second wavelength range;
a first light modulation device, into which the other of the light having the first polarization in the first wavelength range and the light having the second polarization in the first wavelength range is entered, that modulates the entering light according to image information and forms an image light;
an optical element that separates the light in the second wavelength range into a light in a third wavelength range and a light in a fourth wavelength range;
a second light modulation device that modulates the light in the third wavelength range according to the image information and forms an image light;
a third light modulation device that modulates the light in the fourth wavelength range according to the image information and forms an image light; and
a projection system that projects the image lights,
wherein the wavelength conversion element has a first surface entered by the light in the first wavelength range and a second surface different from the first surface and outputting the light in the second wavelength range.

2. The projector according to claim 1, wherein the wavelength conversion element has a third surface different from the first surface and the second surface,
a second light emitting device is provided to face the third surface and emit a light in the first wavelength range, and
the light in the first wavelength range emitted from the second light emitting device enters the wavelength conversion element from the third surface.

3. The projector according to claim 2, wherein the wavelength conversion element further has a dielectric multilayer provided on at least one of the first surface and the third surface, transmitting the light in the first wavelength range, and reflecting the light in the second wavelength range.

4. The projector according to claim 1, wherein the first light emitting device and the first light modulation device are optically conjugate with each other.

5. The projector according to claim 2, wherein the first light emitting device and the first light modulation device are optically conjugate with each other.

6. The projector according to claim 3, wherein the first light emitting device and the first light modulation device are optically conjugate with each other.

7. The projector according to claim 1, wherein an area of the second surface is smaller than an area of the first surface.

8. The projector according to claim 2, wherein an area of the second surface is smaller than an area of the first surface.

9. The projector according to claim 3, wherein an area of the second surface is smaller than an area of the first surface.

10. The projector according to claim 4, wherein an area of the second surface is smaller than an area of the first surface.

11. The projector according to claim 5, wherein an area of the second surface is smaller than an area of the first surface.

12. The projector according to claim 6, wherein an area of the second surface is smaller than an area of the first surface.

* * * * *